(12) United States Patent
Ericson et al.

(10) Patent No.: US 8,999,045 B2
(45) Date of Patent: Apr. 7, 2015

(54) REGENERATIVE AIR DRYER

(71) Applicant: Suburban Manufacturing, Inc., Monticello, MN (US)

(72) Inventors: Dustin A. Ericson, St. Cloud, MN (US); Brad Barger, Monticello, MN (US)

(73) Assignee: Suburban Manufacturing, Inc., Monticello, MN (US)

( * ) Notice: Subject to any disclaimer, the term of this patent is extended or adjusted under 35 U.S.C. 154(b) by 133 days.

(21) Appl. No.: 13/735,645

(22) Filed: Jan. 7, 2013

(65) Prior Publication Data

US 2014/0013956 A1 Jan. 16, 2014

Related U.S. Application Data

(60) Provisional application No. 61/583,552, filed on Jan. 5, 2012.

(51) Int. Cl.
*B01D 53/26* (2006.01)
*B01D 53/04* (2006.01)

(52) U.S. Cl.
CPC .......... *B01D 53/261* (2013.01); *B01D 53/0415* (2013.01); *B01D 2257/80* (2013.01)

(58) Field of Classification Search
CPC .. B01D 53/04; B01D 53/0415; B01D 53/261; B01D 2257/80
USPC ........ 96/121, 133, 143, 144; 34/472, 473, 80; 55/DIG. 17
See application file for complete search history.

(56) References Cited

U.S. PATENT DOCUMENTS

| | | | | |
|---|---|---|---|---|
| 3,464,186 | A * | 9/1969 | Walker et al. | 96/115 |
| 3,472,000 | A * | 10/1969 | Bridigum et al. | 96/113 |
| 3,934,989 | A * | 1/1976 | Haugen | 96/113 |
| 4,026,685 | A * | 5/1977 | Grix | 96/113 |
| 4,311,439 | A | 1/1982 | Stofen | |
| 4,816,047 | A * | 3/1989 | Neal | 96/137 |
| 4,969,803 | A | 11/1990 | Turanskyj | |
| 5,286,282 | A * | 2/1994 | Goodell et al. | 96/113 |
| 5,286,283 | A * | 2/1994 | Goodell | 96/113 |
| 5,522,150 | A * | 6/1996 | Schultz | 34/80 |
| 5,595,588 | A * | 1/1997 | Blevins | 96/108 |
| 5,613,843 | A | 3/1997 | Tsuru et al. | |
| 6,071,321 | A * | 6/2000 | Trapp et al. | 55/318 |
| 7,097,696 | B2 * | 8/2006 | Salzman et al. | 96/121 |
| 7,727,313 | B2 * | 6/2010 | Blackwood et al. | 96/134 |
| 7,789,950 | B2 * | 9/2010 | Hoffman et al. | 96/134 |
| 8,167,584 | B2 | 5/2012 | Pyke et al. | |

* cited by examiner

*Primary Examiner* — Frank Lawrence
(74) *Attorney, Agent, or Firm* — Dicke, Billig & Czaja, PLLC

(57) ABSTRACT

A regenerative air drying system including at least one dryer module including a housing having a inlet air passage, an outlet air passage, and a wash air passage. The air dryer system further includes a desiccant canister mounted to the housing and in communication with the inlet, outlet, and exhaust air passages, and a single controllable valve selectively moveable between a first position and a second position, wherein the single controllable valve, when in the first position, forms a supply air flow path from the inlet air passage, through the desiccant canister in a first direction, and to the outlet air passage, and when in the second position, forms a wash air path from the outlet air passage, through the desiccant canister in a direction opposite the first direction, and to the exhaust air passage.

13 Claims, 10 Drawing Sheets

US 8,999,045 B2

REGENERATIVE AIR DRYER

CROSS-REFERENCE TO RELATED APPLICATION

This Non-Provisional Application claims benefit to Provisional Application No. 61/583,552, filed Jan. 5, 2012, entitled: Regenerative Air Dryer, which is incorporated herein by reference.

BACKGROUND

Compressed air systems are used in a wide variety of applications to power a wide variety of devices, such as spray or paint guns in a compressed air painting system, for example. In order to prevent damage to air powered devices, such as through corrosion, for example, or to prevent adversely affecting processes, such as contaminating paint in a spray painting process, for example, the compressed air is dried and other contaminants removed prior to being used.

Air drying systems, including regenerative air drying systems, have been developed for such purposes. Regenerative air drying systems pass air through a desiccant material which removes moisture from the compressed air, with the desiccant material being able to be dried, or regenerated, and reused. Such systems typically employ more than one desiccant container so that one container can continue to provide dry air while the desiccant material in the other container is being regenerated. While such systems are effective at drying air, they employ complex systems for switching between the desiccant containers and have complicated piping and valve systems that produce large pressure losses in the system and make system expansion difficult.

SUMMARY OF THE INVENTION

One embodiment provides a regenerative air dryer which is smaller, has fewer moving parts, has single-point control, has simplified air paths, reduces external piping, and provides decreased air pressure losses relative to conventional air dryers.

One embodiment provides a regenerative air dryer system including at least one dryer module including a housing having an inlet air passage, an outlet air passage, and a wash air passage. The air dryer system further includes a desiccant canister mounted to the housing and in communication with the inlet, outlet, and exhaust air passages, and a single controllable valve selectively moveable between a first position and a second position, wherein the single controllable valve, when in the first position, forms a supply air flow path from the inlet air passage, through the desiccant canister in a first direction, and to the outlet air passage, and when in the second position, forms a wash air path from the outlet air passage, through the desiccant canister in a direction opposite the first direction, and to the exhaust air passage.

DETAILED DESCRIPTION

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
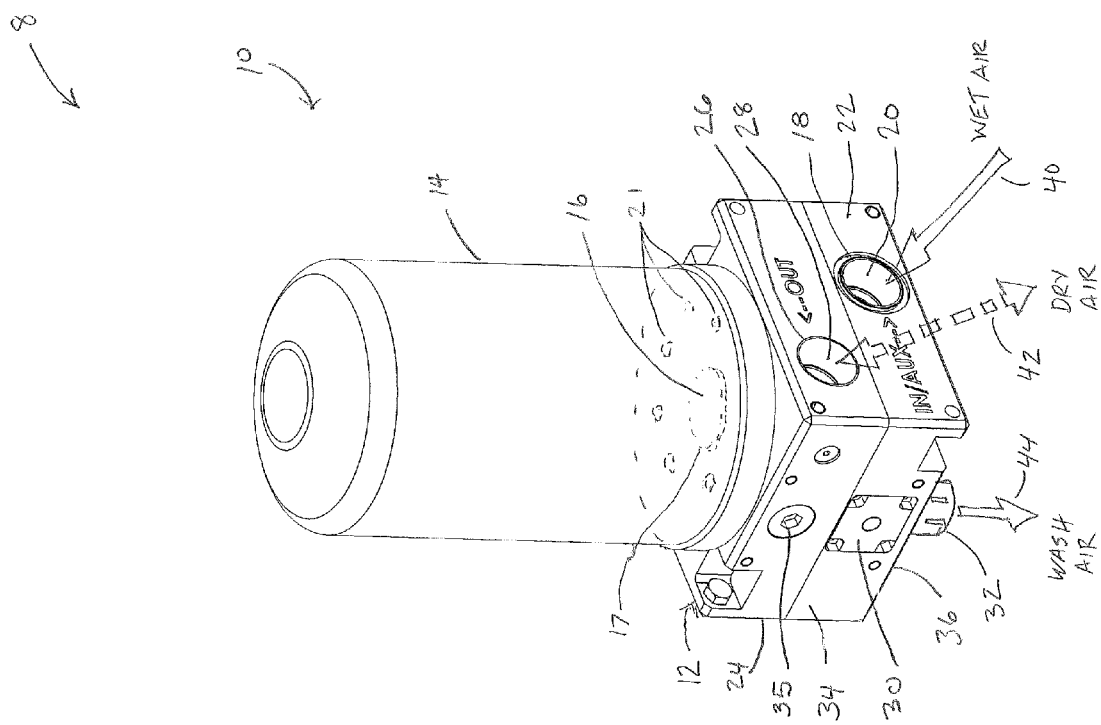
FIG. 1 is a perspective view generally illustrating a modular regenerative air dryer system including a dryer module according to one embodiment.

FIG. 1 is a perspective view generally illustrating a modular regenerative air dryer system 8, according to one embodiment of the present application, for drying air for compressed air systems (e.g. an air compressor). Modular regenerative air dryer system 8 includes a dryer module 10, with dryer module 10 including a housing 12, a desiccant canister 14, and a valve cartridge 16 including a threaded portion 17 that serves as a mounting stud for coupling desiccant canister 14 to housing 12. Although illustrated in FIG. 1 as including only a single dryer module 10, as will be described in greater detail below, modular regenerative air dryer system 8 may include two or more dryer modules 10 which are coupled together to provide increased air drying capacity (see FIGS. 6-9, for example).

According to one embodiment, housing 12 includes a pair of inlet air ports 18 on opposite ends of an inlet air passage 20 extending through housing 12 from one end face 22 to an opposing end face 24 (see FIG. 2), a pair of outlet air ports 26 on opposite ends of an outlet air passage 28 extending through housing 12 from end face 22 to opposing end face 24 (see FIG. 2), an actuating mechanism, such as a piston or spool valve 30, and an exhaust vent, such as a muffler 32. According to one embodiment, spool valve 30 is disposed within housing 12 via a side face 34 of and muffler 32 extends from a bottom face 36 of housing 12. According to one embodiment, housing 12 includes a device outlet air port 35 disposed on side face 34 that is in communication with outlet air passage 28 and which can be used as a connection point for a compressed air device (e.g. a paint gun), wherein device outlet port 35 can be plugged when not being used (as illustrated).

Figure 2:
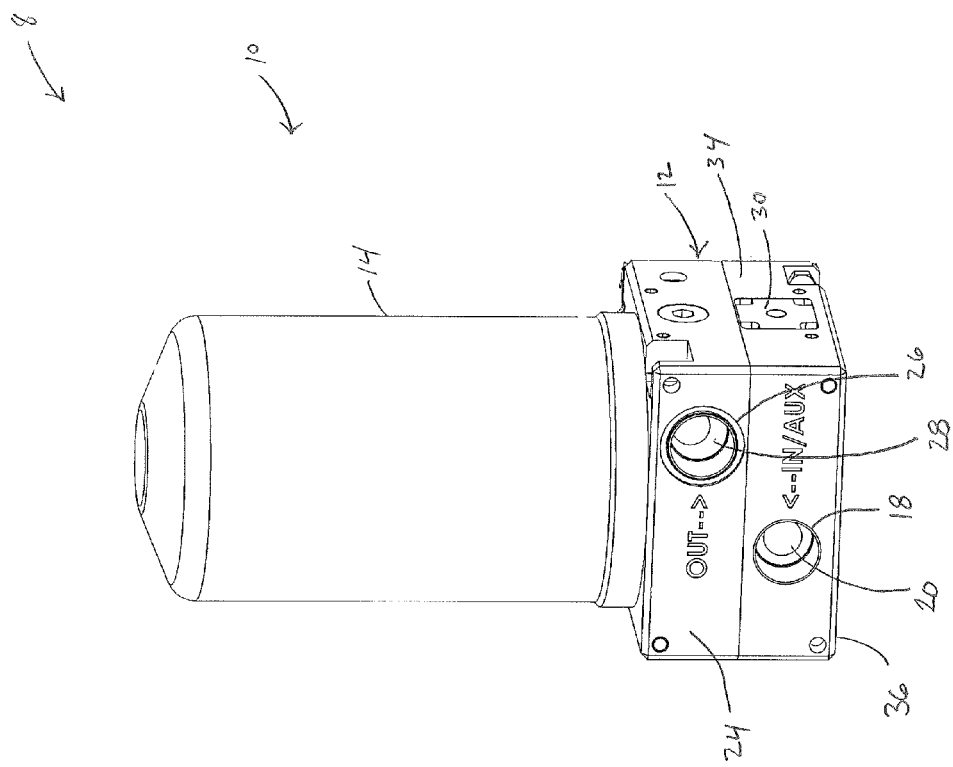
FIG. 2 is a perspective view generally illustrating a dryer module according to one embodiment.

FIG. 2 is a perspective view of dryer module 10 illustrating end face 24, which opposes end face 22, with inlet and outlet air ports 18 and 26, and inlet and outlet air passages 20 and 28 extending through housing 12. As will be described in greater detail below, dryer module 10 receives a compressed "wet" supply air flow 40, such as from a compressor or compressor system (not shown), via inlet air port 18, dries the wet air via desiccant canister 14, and provides a "dry" outgoing air flow 42 via outlet air port 46.

The inlet air port 18 to which a compressor system is connected, and the outlet air port 26 to which a device is connected, such as compressed air storage tank (not shown), is selectable, with the unused port able to be plugged. For example, inlet air port 18 on end face 22 and outlet air port 26 on opposing end face 24 can be selected, with inlet and outlet air ports 18 and 26 on end faces 24 and 22 being plugged, and vice versa. Similarly, inlet and outlet air ports 18 and 26 on a same end face, such as end face 22, can be selected, with inlet and outlet air ports 18 and 26 on opposing end face 24 being plugged. This flexibility in selection and configuration of inlet and outlet air ports 18 and 28 enables modular regenerative air dryer system 8 to be installed in a wider variety of positions and locations as compared to conventional air drying systems having only one set of inlet and outlet ports which are typically positioned on a front side of the system.

Figure 3:
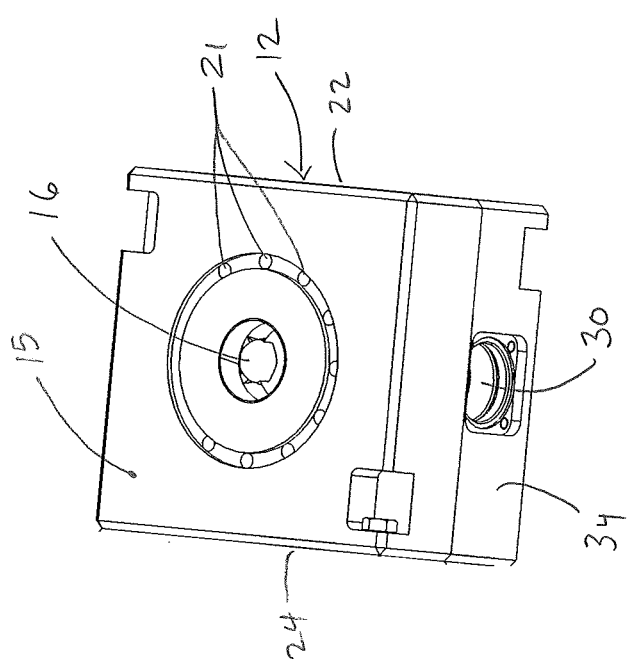
FIG. 3 is a perspective view generally illustrating a dryer module according to one embodiment.

FIG. 3 is a perspective view illustrating a top face 15 of housing 12 with desiccant canister 14 being removed, and illustrates generally valve cartridge 16 and a plurality of canister holes 21 arrayed in an arced pattern within and along a perimeter edge of desiccant canister 14. As will be described in greater detail below, desiccant canister 14 has an air flow path in communication with outlet air passage 28 via valve cartridge 16, with canister holes 21 being in communication with a chamber internal to housing 12 which, in-turn, is in communication with inlet air passage 20 and a fluid passageway that leads to muffler 32.

As will be described and illustrated in greater detail below (see FIGS. 4 and 5), spool valve 30 extends within a shaft or bore in housing 12 and is moveable between at least a first position and a second position (e.g. a retracted position and an extended position) to control the path and direction of air flow between inlet and outlet air passages 20 and 28, desiccant canister 14, and muffler 32, and thereby control the mode of operation of dryer module 10. According to one embodiment, the position of spool valve 30 dictates whether dryer module 10 in an air drying mode or a regeneration mode.

According to one embodiment, spool valve 30 is placed in a retracted position to operate dryer module 10 in the air drying mode. In air drying mode, wet supply air flow 40 is received (e.g. ambient air being drawn in by an air compressor or compressor system) via inlet port 18 and directed through inlet air passage 20 to desiccant canister 14 via fluid passages leading to canister holes 21. The wet supply air flow 40 then passes through desiccant canister 14, which removes moisture from the wet supply air 40, via desiccant media therein, to provide the resulting dry outgoing air flow 42 which exits canister 14 via a drying orifice in valve cartridge 16 and enters outlet air passage 28 where it is directed via outlet air port 26 to a downstream device, such as storage tank (not shown).

According to one embodiment, spool valve 30 is placed in the retracted position to operate dryer module 10 in the regenerative mode, wherein moisture is removed from desiccant media within desiccant canister 14 (i.e. the desiccant media is dried). In regenerative mode, dry air 42 is received via outlet port 28 from a dry air source (for example, a storage tank or another dryer module 10 (not illustrated) which is in a drying mode) and is directed through outlet air passage 28 and into desiccant canister 14 via a regeneration orifice in valve cartridge 16. The flow of dry through the regeneration orifice, also referred to as "wash" air, passes through desiccant canister 14 in a direction opposite to which the flow of wet supply air 40 passes through desiccant canister 14 when dryer module 10 is operating in the drying mode. The flow of dry wash air removes collected moisture from the desiccant material in desiccant canister 14 to form a flow of wet wash air 44 which is directed out of desiccant canister 14 through canister holes 21 and is ultimately expelled from dryer module 10 via muffler 32.

Figure 4:
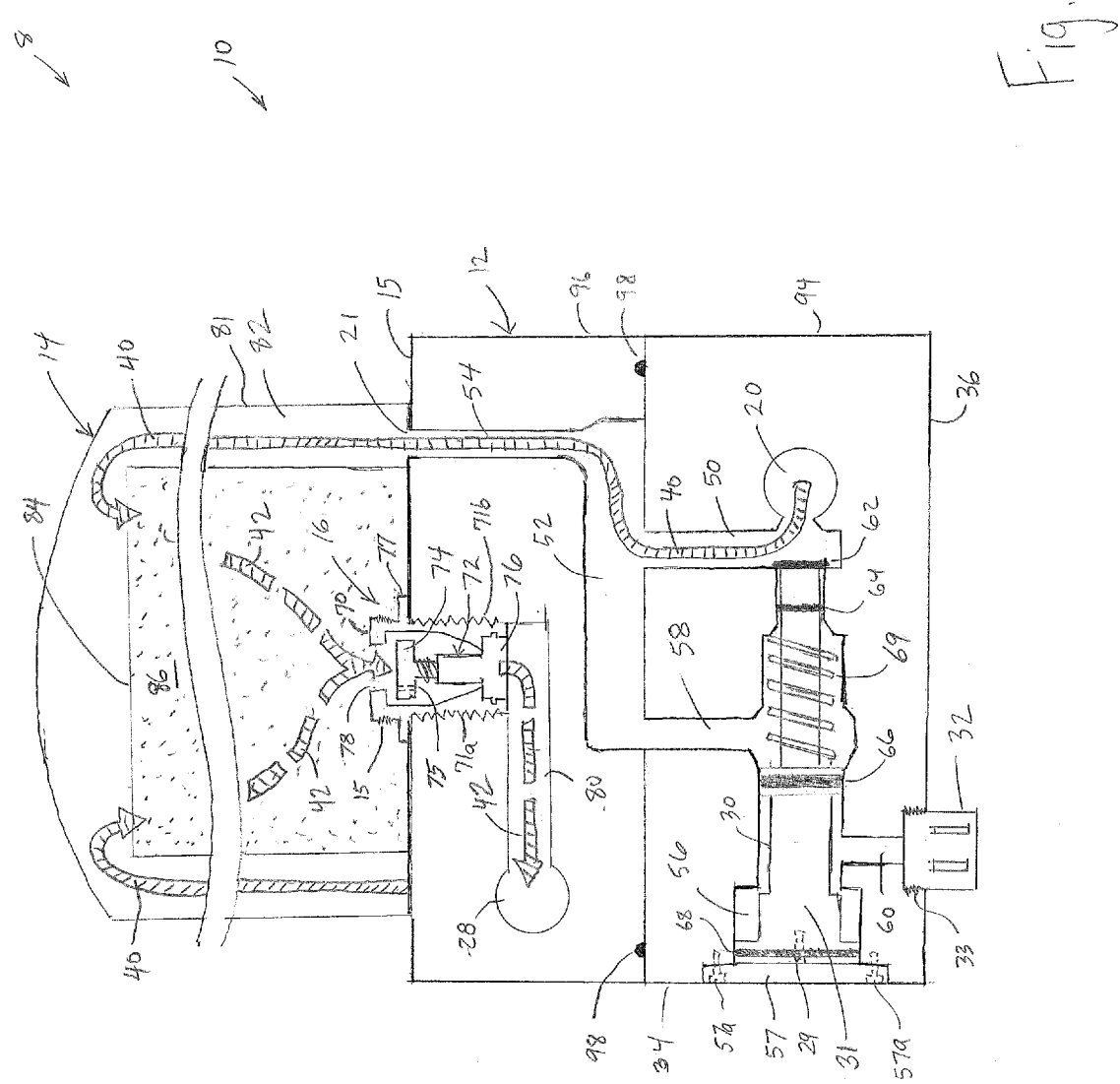
FIG. 4 is a cross-sectional view of a dryer module and illustrating the operation thereof according to one embodiment.
Figure 5:
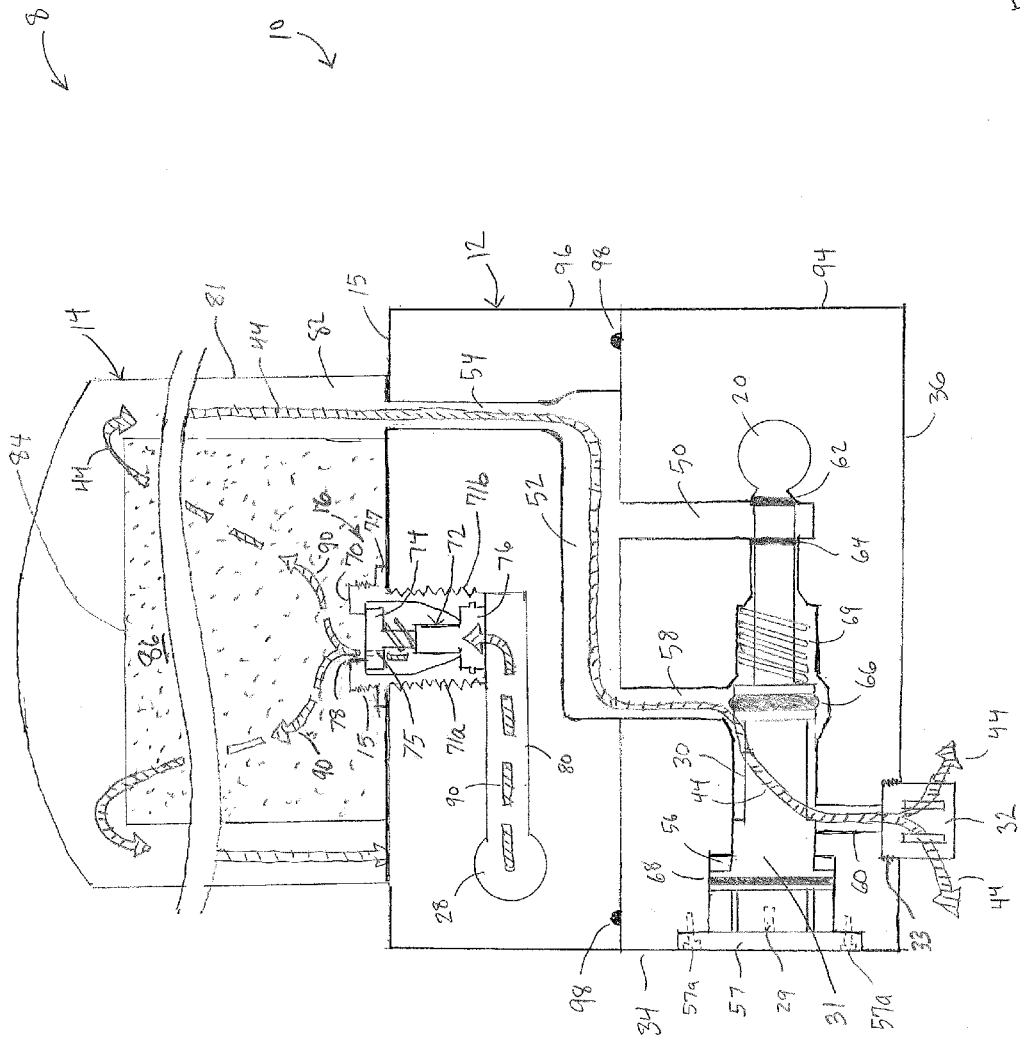
FIG. 5 is a cross-sectional view of a dryer module and illustrating the operation thereof according to one embodiment.

FIGS. 4 and 5 are cross-sectional views through dryer module 10, and illustrate in greater detail housing 12, desiccant canister 14, valve cartridge 16, and spool valve 30, and which respectively illustrate the air drying and regenerative operating modes of dryer module 10.

With reference to FIG. 4, inlet and outlet air passages 20 and 28 extend through housing 12 in directions into and out of the page, between inlet and outlet air ports 18 and 26 (see FIGS. 1 and 2). Housing 12 includes a supply air shaft 50 extending between inlet air passage 20 and an air chamber 52. According to one embodiment, air chamber 52 is semicircular in shape with a plurality of bi-directional air shafts 54 along its circumference (only one shaft 54 is illustrated) which extend through housing 12 and form a corresponding canister hole 21 in top face 15 (see FIG. 3).

Spool valve 30 is positioned within a valve shaft 56 extending into housing 12 from side face 34 to supply air shaft 50. A first wash air shaft 58 extends between air chamber 52 and valve shaft 56, and a second wash air shaft 60 extends between valve shaft 56 and bottom face 36 of housing 12, terminating at muffler 32. According to one embodiment, as illustrated, muffler 32 is threaded into a threaded vent or muffler opening 33 in housing 12.

According to one embodiment, as illustrated generally by FIG. 4, spool valve 30 includes a plurality of sealing devices spaced apart along a body 31. According to one embodiment, as illustrated, body 31 has a stepped, cylindrical shape. According to one embodiment, the plurality of sealing devices includes a first gasket 62, a second gasket 64, a third gasket 66, and a fourth gasket 68. According to one embodiment, each of the gaskets 62, 64, 66, and 68 is an O-ring positioned about the stepped, cylindrical body of spool valve 30. A spring 69 is disposed about a portion of body 31 of spool valve 30 between second and third gaskets 64 and 66 and biases spool valve 30 to the retracted position (i.e. the position illustrated in FIG. 4). Spool valve 30 is actuated within valve shaft 56 between an extended position and a retracted position by any number of actuating means, including pneumatic and electric means, for example.

According to one embodiment, spool valve 30 is retained within valve shaft 56 by a retaining cover 57 which attached to housing 12 via one or more screws 57a. According to one embodiment, to remove spool valve 30 from valve shaft 56, retaining cover 57 is first removed, and a screw can be temporarily threaded into a threaded female shaft 29 within spool valve 30 and employed to pull spool valve 30 from valve shaft 56.

According to one embodiment, as illustrated generally by FIG. 4, valve cartridge 16 has a body 70 with a threaded portion 71a that screws into a corresponding female threaded opening 71b that extends through housing 12 from top face 15 to an outlet air shaft 80. Body 70 further includes threaded portion 17 which extends above top face 15 and serves as a mounting stud to which desiccant canister 15 is threadably mounted. According to one embodiment, body 70 includes a hexagonal flange 77 which limits how far valve cartridge 16 can be screwed into threaded opening 70, and also serves as a nut to enable a tool, such as a socket, to be used to install or remove valve cartridge 16 from housing 12 (or to remove valve cartridge 16 from desiccant canister 14 should it remain attached thereto upon removal of desiccant canister 14 from housing 12) without damaging threaded portions 15 and 71a.

Valve cartridge 16 further includes a plunger or check valve 72 disposed within body 70 having a spring loaded flange portion 74 extending from a base portion 76, with flange portion 74 including a regeneration orifice 75 extending there through. As will be described in greater detail below, check valve 72 opens and closes a drying orifice 78 in body 70 to control the flow of dry air 42 between desiccant canister 14 and dry outlet air passage 28 via outlet air shaft 80, with the spring-loaded flange portion 74 being biased so as to close orifice 78 in the absence of a flow of wet supply air 40 into desiccant canister 14

According to one embodiment, valve cartridge 16 is modular in design and can be replaced with valve cartridges 16 having different threaded portions 15 accommodate different types and sizes of desiccant canisters 14. Similarly, different valve cartridges 16 may have differently sized check valves 72, regeneration orifices 75, and drying orifices 78 to provide different volumes of air flow. The modular nature of valve cartridge 16 enables one valve cartridges to be quickly replaced to accommodate changing system requirements.

According to one embodiment, as illustrated by FIG. 4, desiccant canister 14 includes a housing 81 forming an outer air passage 82 about an inner portion 84. According to one embodiment, inner portion 84 includes beads of a desiccant media forming a molecular sieve bed 86. According to one embodiment, desiccant canister 14 is removable and threads on to valve cartridge 70.

FIG. 4 illustrates dryer module 10 when operating in the air drying mode, with spool valve 30 being in a first or retracted position so that gaskets 62, 64, and 66 are positioned to prevent the flow of wet supply air 40 from exiting housing 12 via second wash air shaft 60 and muffler 32. With spool valve 30 in the retracted position, the flow of wet supply air 40 (as indicated by the unbroken directional arrows) travels from inlet air passage 20, through supply air shaft 50 to air chamber 52. From air chamber 52, the wet supply air 40 enters the outer portion of desiccant canister 14 via the plurality of air shafts 54 and the corresponding plurality canister holes 21. The flow of wet supply air 40 then travels up through outer air passage 82 and enters the molecular sieve bed 86 at the top of the desiccant canister 14.

As the flow wet supply air 40 travels downward through molecular sieve bed 86, moisture is removed from the flow of wet supply air 40 to form the flow of dry output air 42 (as indicated by the broken directional arrows). The pressure from the flow of dry air 42 forces check valve 72 to the open position, and dry output air 42 flows through orifice 78 and through valve cartridge 16 to dry outlet air passage 80. The flow of dry output air 42 then flows through outlet air passage 28 to a storage container, such as a pressurized storage tank (not shown), with a portion of the flow of dry output air 42 potentially being employed by a different air dryer module 10 which is in regenerative mode (see FIG. 5 below) or being employed by a device (e.g. a paint spray gun) via device output port 35 (see FIG. 1).

According to one embodiment, housing 12 is machined in two pieces 94 and 96, which are bolted together with a gasket 98 disposed there between in a gasket channel.

FIG. 5 illustrates dryer module 10 when operating in the regenerative mode with spool valve 30 being in a second or extended position such that first gasket 62 is positioned to seal and prevent a flow wet supply air 40 from entering supply air shaft 50 from inlet air passage 20. Additionally, third gasket 66 is in a position such that it no longer seals first wash air shaft 58 from second wash air shaft 60, so that first and second wash air shafts 58 and 60 are now in communication with one another via valve shaft 56.

With spool valve 30 in the extended position, there is no flow of wet supply air 40 to desiccant canister 14 so that back-pressure from dry output air 42 (e.g. from a storage tank or another dryer modules 10) spring-loaded flange portion 74 keep check valve 72 in the closed position thereby sealing drying orifice 78. However, regenerative orifice 75 allows a small flow of dry output air 42 through flange portion 74 of check valve 72, thereby creating a flow of dry wash air 90 to flow through desiccant canister 14 in a direction opposite to the flow of wet supply air 40 through desiccant canister 14 when dryer module 10 is being operating in the air drying mode.

In regenerative mode, the flow of dry wash air 90 flows from output air passage 28, through dry outlet air passage 80, through regenerative orifice 75 of check valve 72, and into molecular sieve bed 86 (as indicated by the broken directional arrow). As the flow of dry wash air 90 passes through molecular sieve bed 86, it absorbs moisture (and potentially other contaminants) collected by the molecular sieve bed 86 and forms a flow of wet wash air 44 which exits molecular sieve bed 86 and enters outer air passage 82. The flow of wet wash air 44 then travels down outer air passage 82 to air chamber 52 of housing 12 via canister holes 21 and bi-directional air shafts 54. The wet wash air 44 then continues through first wash air shaft 58, past third gasket 66, and through valve shaft 56 about a portion of spool valve 30 where it enters second wash air shaft 58 and is expelled from housing 12 via muffler 32.

By removing the accumulated water and other contaminants from the desiccant material of molecular sieve bed 86 in this fashion, the beads of desiccant material are dried and cleaned and can once again be used to clean wet supply air 40 upon returning spool valve 30 to the retracted position. The above described process is employed each time the beads of descant material of molecular sieve bed 86 are cleaned.

While described above in terms of a single dryer module 10 for ease of illustration, modular regenerative air dryer system 8 may include multiple dryer modules 10 which are coupled together to provide increased air drying capacity. For example, modular regenerative air dryer system 8 may include two, three, four, etc. air dryer modules 10 coupled together to form a system.

Figure 6:
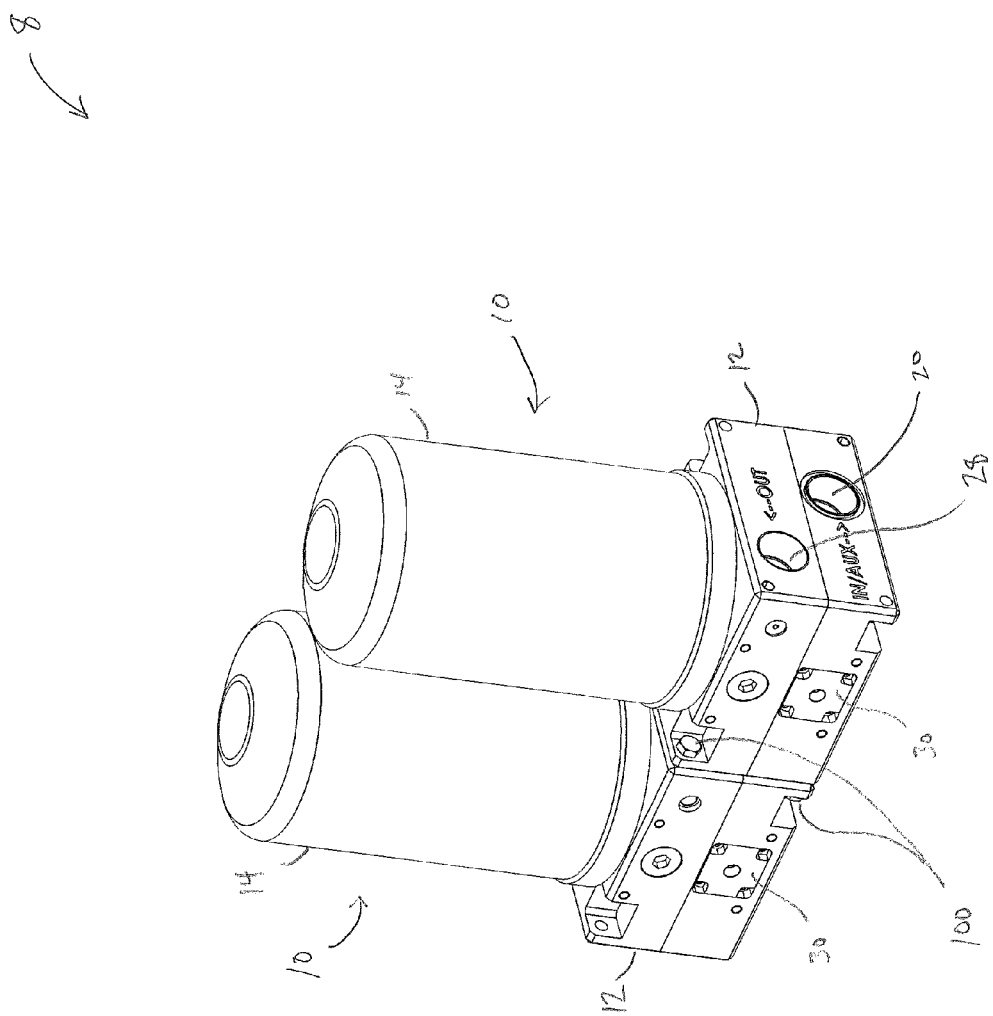
FIG. 6 is a perspective view generally illustrating a modular regenerative air dryer system including multiple dryer modules according to one embodiment

FIG. 6, for example, is a perspective view generally illustrating an embodiment of modular regenerative air dryer system 8 including two dryer modules 10. According to one embodiment, as illustrated, side faces 22 and 24 of the two dryer modules 10 are bolted together at each of the four abutting corners of housings 12 using bolts, such as indicated at 100. When coupled together, the inlet and outlet air passages 20 and 28 on side face 24 of one of the modules 10 align with the inlet and outlet air passages 20 and 28 on side face 22 of the other one of the modules 10 so as to combine to form continuous inlet and outlet air passages 20 and 28 that extend through both of the housings 12. In one embodiment, seals are positioned about inlet and outlet ports 18 and 26 of the adjacent modules 10 prior to their being bolted together so as to eliminate leaks at the "joints" of the continuous inlet and outlet air passage 20 and 28. As before, the non-selected input and output ports 18 and 26 of continuous inlet and outlet air passages 20 and 28 are sealed with a plug.

Figure 7:
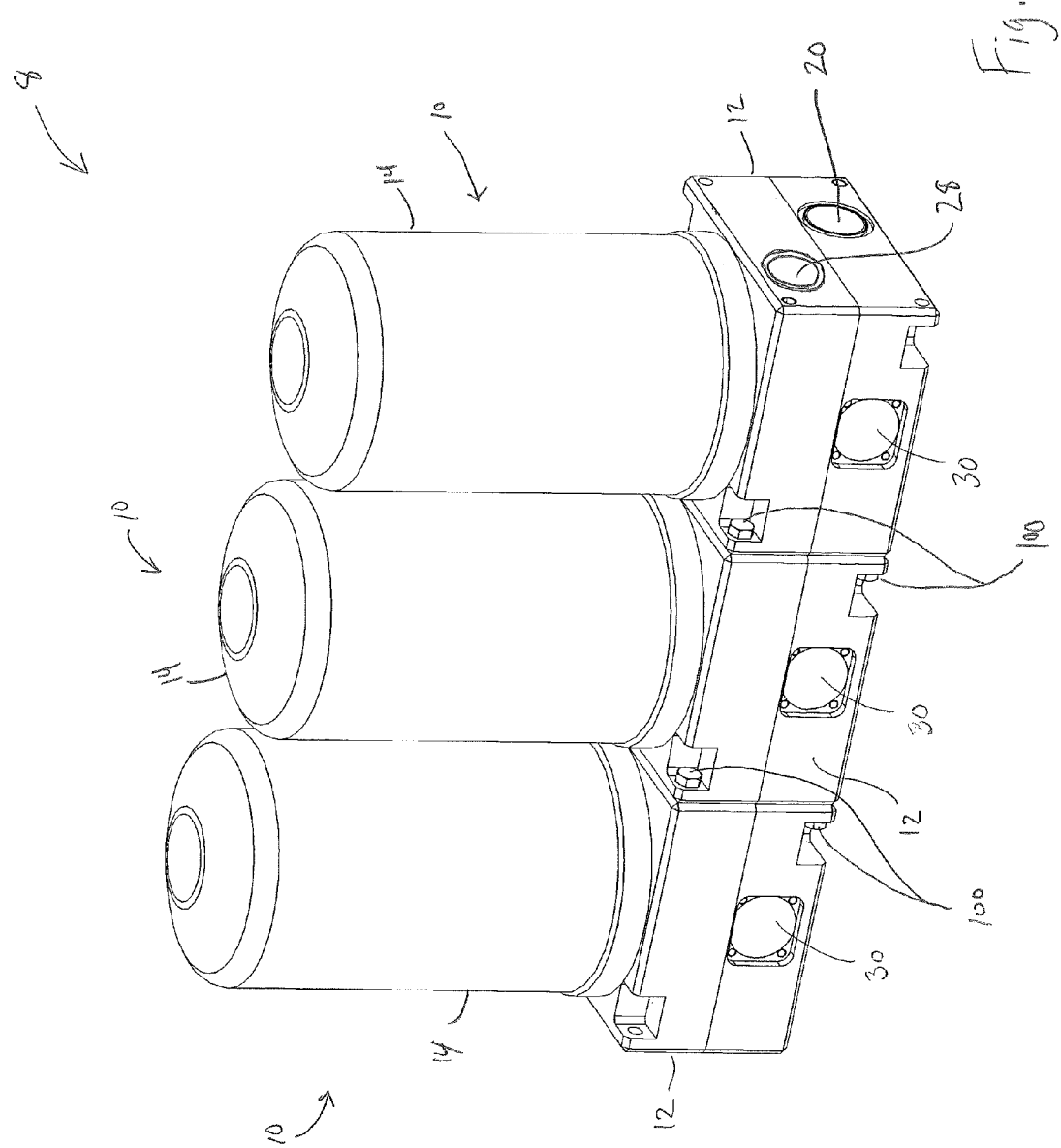
FIG. 7 is a perspective view generally illustrating a modular regenerative air dryer system including multiple dryer modules according to one embodiment

Similarly, FIG. 7 is a perspective view illustrating an embodiment of modular regenerative air dryer system 8 including three dryer modules 10. Again, the dryer modules 10 are bolted together at each of the four corners of each of the abutting faces of housings 12 using bolts, such as indicated at 100. When coupled together, the inlet and outlet air passages 20 and 28 of each of the modules 10 align with one another and combine to form continuous inlet and outlet air passages 20 and 28 extending through the three housing 12.

The modular configuration of air dryer modules 10, including the positioning of pars of inlet and outlet air ports 18 and 26 on opposing faces of housing 12, enables any number of air dryer modules 10 (e.g. two, three, four, and even more) to be simply and easily coupled together, with no external piping, to form regenerative air dryer system 8 of varying air drying capacity. Such a modular configuration enables air dryer system 8 to be easily adapted (e.g. expanded or downsized) to meet changing compressed air requirements. In contrast to simply bolting a pair of housings 12 together with four bolts, in order to add additional air drying capacity, conventional air drying systems typically require that the existing system be at least partially disassembled and require complicated piping, valves, and connectors to be installed to add system components (e.g. "banjo" fittings, elbows, tees, crosses, etc.), wherein such external piping and components are difficult and time consuming to install and restrict air flow, thereby resulting in increased pressure losses in the system.

Regenerative air dryer system 8, according to the present application, also enables one air dryer module 10 to added (or subtracted) at a time and thereby enables system capacity to be changed in smaller increments relative to conventional systems. Typically, conventional air drying systems require that "pairs" of interconnected desiccant containers (along with the associated piping and control valves) to added at a given time (so that one canister can dry air while the other is being regenerated), thereby forcing system capacity to be expanded (or reduced) in larger increments. As a result, system capacity in such conventional air drying systems may be forced to be greater than what is required due to the restriction of having to expand the system using "pairs" of desiccant containers.

According to one embodiment, each dryer module 10 of air dryer system 8 is rated for a 5-horsepower air compressor, such that an air dryer system 8 having two dryer modules 10 is rated for a 10-horsepower air compressor, an air dryer system 8 having three dryer modules 10 is rated for a 15-horsepower air compressor, and so on. As described above, according to one embodiment, dryer module 10 has a valve cartridge 16 with a check valve 72 having an orifice 78 sized and selected to correspond to different horsepower requirement. As such, in addition to being able to add one or more air drying modules 10 in a modular fashion to increase the air drying capacity of a regenerative air drying system 8 as described herein, the air drying capacity of system 8 can also be adjusted in a modular fashion by changing out the modular valve cartridge 16.

According to one embodiment, each dryer module 10 is rated for 40 cfm (cubic feet per minute) of flow, with each dryer module 10 having a flow rate based on specific system requirements, wherein the flow rate can be modified based on the size of orifice openings and on sequencing in the mode of operation between multiple dryer modules 10 of air dryer systems 8 employing multiple air dryer modules.

According to one embodiment, when modular regenerative air dryer system 8 is formed using multiple dryer modules 10, air dryer system 10 is operated so that only one dryer module 10 is in the regenerative mode at a given time.

Figure 8:
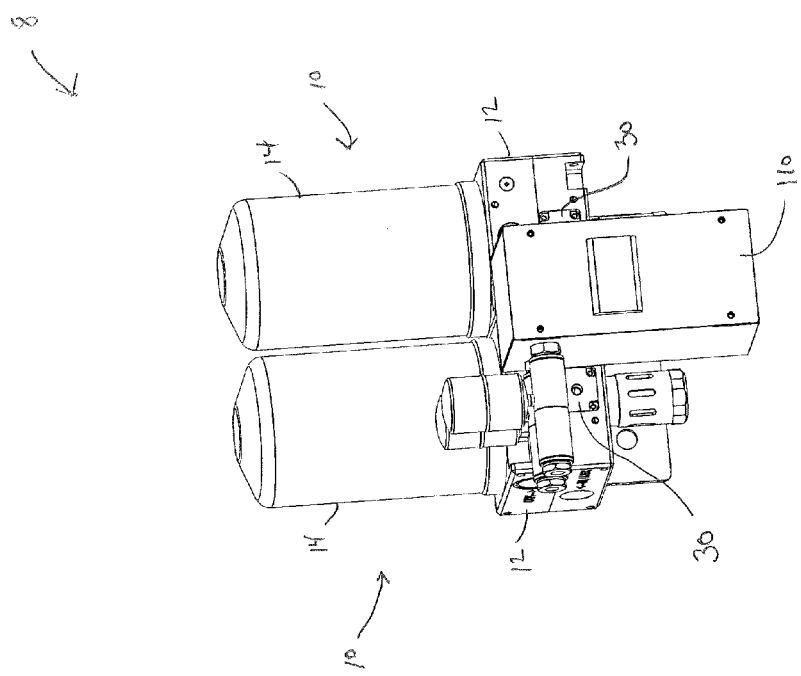
FIG. 8 is a perspective view generally illustrating a modular regenerative air dryer system according to one embodiment.

FIG. 8 is a perspective view generally illustrating modular regenerative air dryer system 8 including two dryer modules 10, and further including a controller 110 (e.g a PLC controller) for controlling the operation of spool valves 30 of each dryer module 10 to coordinate regeneration of the desiccant media of desiccant canisters 14. According to one embodiment, as mentioned above, only one dryer module 10 of air dryer system 8 is placed in the regenerative mode at a given time.

For example, after both dryer modules 10 are first pressurized and air dryer system 8 is providing a stable flow of dry output air 42, controller 110 is configured to direct spool valve 30 of a first one of the dryer modules 10 to move to the extended position to begin the regenerative drying process, while spool valve 30 of a second one of dryer modules 10 is maintained in the retracted position so as to continue operating in the air drying mode. Upon completion of the regenerative drying process of the first dryer module 10, controller 110 is configured to direct the spool valve 30 of the first dryer module 10 to return to the retracted position so as to return the first dryer module 10 to the air drying mode.

Thereafter, controller 110 repeats the above described process with the second dryer module 10. By controlling the regenerative drying processes of the two dryer modules 10 so as to have only one of the two dryer modules 10 operating in the regenerative mode while the other is operating in the air drying mode, modular regenerative air dryer system 8, according to the present application, eliminates sudden and undesirable air pressure changes caused by simultaneous or overlapping regeneration of desiccant canisters as done in conventional air drying systems.

It is noted that above control process can be adapted and applied to a modular regenerative air dryer system 8 formed by any number of coupled dryer modules 10. Whatever the number of dryer modules 10 (other than one), controller 110 is configured to control the spool valves 30 of each of the dryer modules 10 so that only one of the dryer modules 10 is being operated in the regenerative mode at a given time, with no overlap between the regeneration processes of the air dryer modules 10.

According to one embodiment, the normal operation of a regenerative air dryer system 8 having two dryer modules 10, for example, includes the first air dryer module 10 being operated in a regenerative mode and the second air dryer module 10 being in an air drying mode. When the desiccant material in canister 14 of the second air module 10 needs to be regenerated (i.e. cleaned), the respective positions of spool valves 30 of the first and second air dryer modules 10 are reversed so that the second air dryer module 10 is placed in a regenerative mode and the first air dryer module 10 is placed in an air drying mode. To avoid a pressure surge or spike that could result from a simultaneous changeover of the respective spool valves 30, the first air dryer module 10 is switched from the regenerative mode to the air drying mode while the second air dryer module 10 remains in the air drying mode. Only after stable air flow has commenced through the first air dryer module 10 after being placed in the air drying mode is the second air dryer module 10 placed in the regenerative mode.

As described above, in operation of regenerative air dryer system 8, each of the one or more air dryer modules 10 includes only two moveable parts, check valve 72 and spool valve 30, and only a single control point, that being spool valve 30. The use of only two moving parts, single-point control via spool valve 30, modular valve cartridge 70, and the reduction/elimination of external piping greatly simplifies control, maintenance, and operation of a regenerative air dryer system 8, according to the present application. In contrast, conventional air drying systems include numerous moving parts and multiple control valves that must be operated in precise sequences in order to provide air drying and regenerative operating modes, and further include complicated piping and valve systems that must be disassembled/added in order to modify the air drying capacity of the system, and which require time consuming and costly maintenance.

Additionally, each of the air drying modules 10 of regenerative air drying system 8 is configured with short and direct air flow paths within housing 12 that greatly reduce air pressure losses relative to conventional air drying systems having complex air passages. As mentioned above, whereas conventional air drying systems employ complicated external piping and valve systems, the "piping" of air dryer modules 10, according to the present application, is completely internal to housings 12 and is configured so as to reduce/minimize path lengths and turns in order to reduce pressure losses (wherein pressure losses increase the amount of energy required to provide desired output pressures and flows).

For example, with reference to FIG. 4, according to one embodiment, a flow path of supply air through housing 12, when dryer module 10 is operating in drying mode (excluding desiccant canister 14), is through inlet air passage 20, through supply air shaft 50, air chamber 52, and bi-directional air shafts 54 to desiccant canister 14, and then through valve cartridge 18 to outlet air shaft 80, and lastly through outlet air passage 28.

According to one embodiment, housing 12 has dimension of approximately 6-inches between opposing side faces (e.g. between side faces 22 and 24) and a height between top face 15 and bottom face 36 of 4-inches (6"×6"×4"). According to one embodiment, a flow path of supply air through housing 12, as described above, has a total length of approximately only 12.5 inches and a combined 450 degrees of turns within housing 12 (excluding desiccant canister 14). According to one embodiment, a flow path of supply air through housing 12 does not exceed 14 inches and does not have more than 450 degrees of turns within housing 12. According to one embodiment, to further reduce pressure losses, supply air shaft 50 is rectangular in shape to increase its surface area and thereby decrease drag on air passing there through, and edges of passages, such as the edges of bi-directional air-shafts 54 and chamber 52, have edges with radiuses to reduce pressure losses as the air transitions from one passage to another.

Additionally, according to one embodiment, housing 12 of dryer module 10 is machined from solid billet aluminum, as opposed to cast aluminum typically employed by cast aluminum. According to one embodiment, the machined billet aluminum is hard coat anodized and Teflon-impregnated to reduce friction of the air passages to further reduce air pressure losses within housing 12 and to minimize corrosion and damage to the air passages from moisture and other contaminants within the supply air as it passes through housing 12. The use of hard-coat anodized aluminum greatly reduces the occurrence of oxidation on the surfaces of housing 12 which otherwise increases air flow resistance and causes increased wear on any moving parts. The use of hard-coat anodized, Teflon-impregnated, machine billet for housing 12 greatly increases the expected operating life of air dryer modules 10, with air drying modules 10 having an expected operating life of up to 18 years, as opposed to 1-2 years for conventional air compressor systems employing cast aluminum.

Together, the elimination of external piping, the short and simple configuration of internal passages forming a flow path of supply air through housing 12, and the materials and coatings on the surfaces of housing 12, work together to greatly reduce pressure losses within air drying system 8 as compared to conventional air drying systems. For example, according to one embodiment, an air drying system 8 employing two air dryer modules 10, as described herein, was measured to have only 2 psi of pressure drop at full flow (40 cfm) as compared to a conventional system having a substantially equal capacity, and being operated under substantially equal parameters, which had a measured pressure drop of 12 psi. In other words, according to such configuration, air drying system 8 according to the present application had only one-sixth the pressure drop of a conventional regenerative air drying system.

Figure 9:
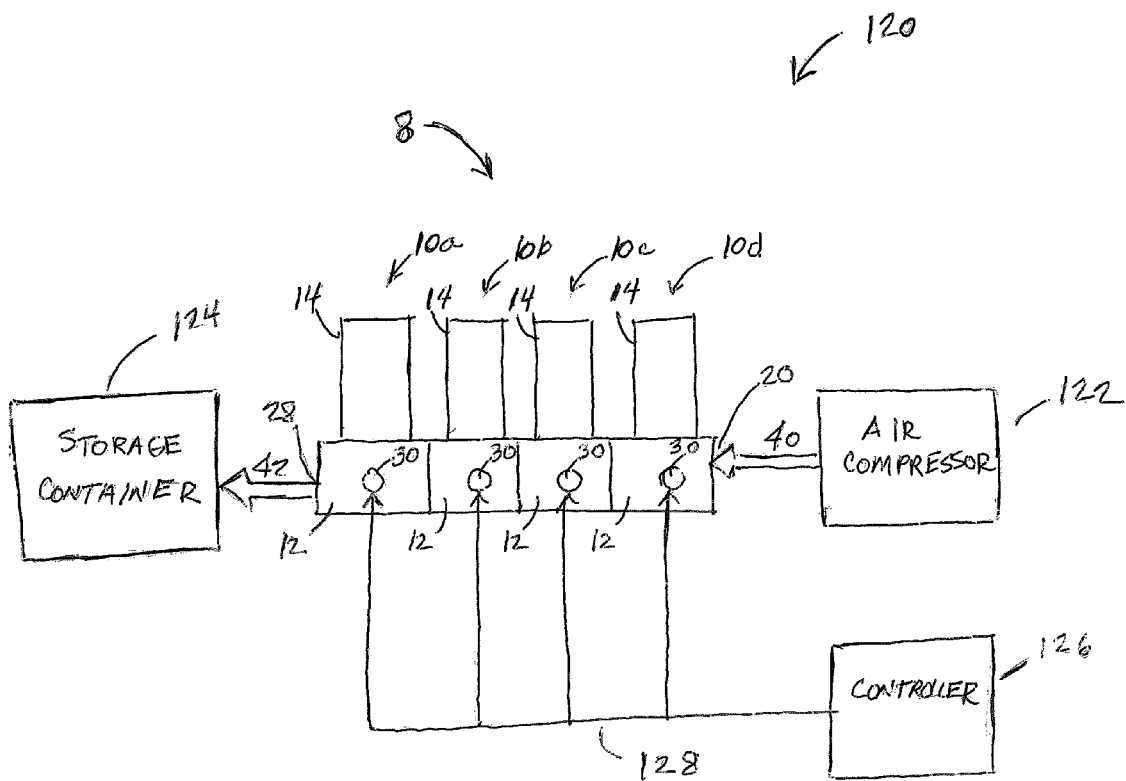
FIG. 9 is block and schematic diagram of a modular regenerative air dryer system according to one embodiment.

FIG. 9 is a block and schematic diagram illustrating generally a compressed air system 120, including an air compressor 122, a storage container 124 for storing compressed and dried air, a controller 126 (e.g. a PLC), and a regenerative air dryer system 8, according to the present application, including four air dryer modules 10, indicated as dryer modules 10a-10d. As described above, the housings 12 of the four air dryer modules 10a-10d are coupled together and form common input and output air passages 20 and 28 shared by air dryer modules 10a-10d.

In operation, regenerative air dryer system 8 receives a supply of "wet" compressed supply air 40 from air compressor 122 via input air passage 20. Dryer modules 10a-10d dry the wet supply air 40 by directing the air through desiccant canisters 14 and provide a flow of dry output air 42 to a storage container 124 (e.g. pressurized tank) via output air passage 28.

According to one embodiment, as described above, after all of the air dryer modules 10a-10d are pressurized and regenerative air dryer system 8 is providing a stable flow of dry output air 42 to storage container 124, controller 126 cycles the air dryer modules 10a-10d through regeneration modes in order to clean or dry the desiccant media within desiccant canisters 14 such that the desiccant canister 14 of only one of the air dryer modules 10a-10d is being regenerated at a time while the remaining three of the air dryer modules continue to dry the supply air flow 40. According to one embodiment, controller 30 controls the positions of spool valves 30 of air dryer modules 10a-10d via control wires 128 to cycle the air dryer modules 10a-10d between air drying and media regenerating modes.

Figure 10:
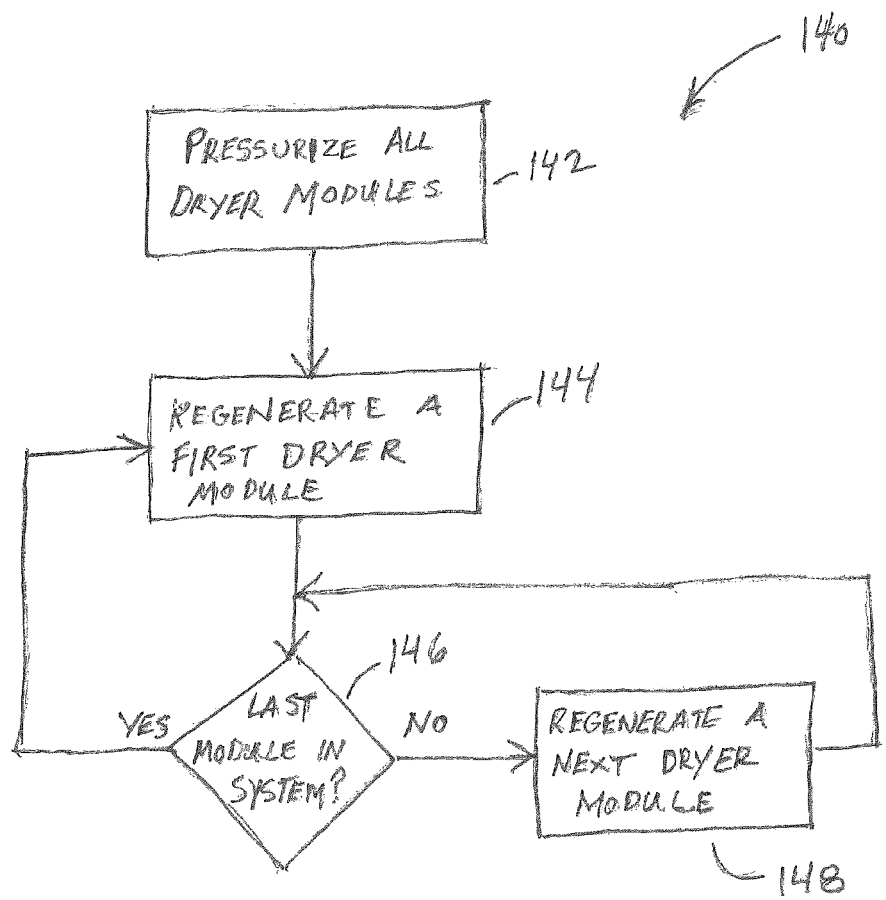
FIG. 10 is a flow diagram illustrating the operation of a modular regenerative air dryer system according to one embodiment.

FIG. 10 is flow diagram illustrating one embodiment of a drying process 140 employing a modular regenerative air dryer system 8 according to the present application, such as air dryer system 8 illustrated by FIG. 9. Process 140 begins at 142 wherein all of the air dryer modules 10 of air dryer system 8 are pressurized and begin providing a stable flow of dry output air 42, such as air dryer modules 10a-10d of FIG. 8 providing a flow of dry output air 42 to storage container 124.

At 144, controller 126 directs spool valve 30 of a first air dryer module 10 of the air dryer system 8, such as air dryer module 10a, to the extended position to begin the regenerative drying process of the desiccant media within the corresponding desiccant canister 14, while the spool valves 30 of the remaining air dryer modules 10b-10d are maintained in the retracted position to so that the remaining air dryer modules 10b-10d continue operating in the air drying mode.

After the regeneration process of air dryer module 10a is complete, process 140 proceeds to 146 where it is queried whether the air dryer module 10 which has just been regenerated is a last one of the four air dryer modules 10a-10d to be regenerated. If the answer to the query at 146 is "no", process 140 proceeds to 148, where a next air dryer module 10 of the four air dryer modules 10a-10d, for example, air dryer module 10b, is regenerated. Process 140 then returns to 144.

If the answer to the query at 146 is "yes", meaning that each of the for air dryer modules 10a-10d has been regenerated to complete a regeneration cycle of the air dryer modules 10, process 140 returns to 144 where the first of the air dryer modules 10a-10d is again regenerated to start the next regeneration cycle.

Again, as described above, by controlling the regenerative drying process so that only one of the dryer modules 10a-10d is operating in the regenerative mode at a given time, while the remaining modules 10a-10d continue to operate in the air drying mode, modular regenerative air dryer system 8, according to the present application, eliminates sudden and undesirable air pressure changes caused by simultaneous or overlapping regeneration of desiccant canisters as done in conventional air drying systems.

Although described as regenerating air dryer modules 10 sequentially from air dryer module 10a to air dryer module 10d, it is noted that the air dryer modules 10a-10d could be regenerated in any selected order. It is also noted that process 140 can include time delays between the drying of one dryer module 10 and a next dryer module 10. Additionally, the process 140 can also be applied to air dryer systems 8 have more or fewer than four air dryer modules 10.

In summary, by employing only two moveable parts, spool valve 30 and check valve 72, and having only a single control point via spool valve 30 to control a mode of operation, air dryer module 10 of modular regenerative drying system 8 according to embodiments of the present application, greatly simplifies control, maintenance, and operation relative to conventional air drying systems. Additionally, the small size and modular design of air dryer modules 10 (e.g., selectable inlet and outlet ports 18 and 26 on opposing faces of housing 12, modular valve cartridge 70, bolt-together housings 12, etc.) enable modular air drying system 8 to be easily installed and repaired, and easily adapted to meet changing compressed air requirements in comparison to conventional compressed air systems. Also, the short and simple flow path for supply air through housing 12, and the hard-coat anodized, and Teflon-impregnated surfaces of housing 12 greatly reduce air pressure losses and greatly increase the operating life (e.g. reduces corrosion) of modular air drying system 8 relative to conventional compressed air systems. Furthermore, staggering the regeneration of desiccant canisters 14 through simple control of spool valves 30 eliminates sudden and undesirable pressure drops during operation of modular air drying system 8 while continuing to provide a stable flow of dry air.

What is claimed is:

1. A regenerative air dryer system comprising:
at least one dryer module including:
a housing having a inlet air passage, an outlet air passage, and a wash air passage;
a desiccant canister including a plurality of canister holes and a drying orifice, the desiccant canister mounted to the housing and in communication with the inlet and wash air passages via the plurality of canister holes and with the outlet air passage via the drying orifice; and
a single controllable valve selectively moveable between a first position and a second position, wherein the single controllable valve, when in the first position, opens the inlet air passage and blocks the wash air passage to form a supply air flow path from the inlet air passage into the desiccant canister via the plurality of canister holes, through the desiccant canister in a first direction, and out of the desiccant canister to the outlet air passage via the drying orifice, and when in the second position, blocks the inlet air passage and opens the wash air passage to form a wash air flow path from the outlet air passage into the desiccant canister via the drying orifice, through the desiccant canister in a direction opposite the first direction, and out of the desiccant canister to the wash air passage via the plurality of canister holes.

2. A regenerative air dryer system comprising:
at least one dryer module including:
a housing having a inlet air passage, an outlet air passage, and a wash air passage:
a desiccant canister including a plurality of canister holes and a drying orifice, the desiccant canister mounted to the housing and in communication with the inlet and wash air passages via the plurality of canister holes and with the outlet air passage via the drying orifice; and
a single controllable valve selectively moveable between a first position and a second position, wherein the single controllable valve, when in the first position, forms a supply air flow path from the inlet air passage into the desiccant canister via the plurality of canister holes, through the desiccant canister in a first direction, and out of the desiccant canister to the outlet air passage via the drying orifice, and when in the second position, forms a wash air flow path from the outlet air passage into the desiccant canister via the drying orifice, through the desiccant canister in a direction opposite the first direction, and out of the desiccant canister to the wash air passage via the plurality of canister holes, wherein the at least one dryer module operates in an air drying mode when the single controllable valve is the first position and in a regenerative mode when the single controllable valve is in the second position, the at least one dryer module further including a single check valve having a regeneration orifice extending there through, the check valve disposed within the drying orifice to control air flow there though, wherein the check valve opens to allow supply air to pass from the desiccant canister to outlet air passage when the at least one dryer module is in the air drying mode, and wherein the check valve closes and allows a wash air flow through the regeneration orifice from the outlet air passage into the desiccant canister when the at least one dryer module is in the regenerative mode.

3. A regenerative air dryer system comprising:
at least one dryer module including:
a housing having an inlet air passage, a wash air passage, and an outlet passage;
a desiccant canister including a plurality of canister holes and a drying orifice, the desiccant canister mounted to the housing and in communication with the outlet air passage via only the drying orifice and in communication with the inlet and wash air passages via only the plurality of canister holes; and
a single controllable spool valve moveable between a first position, where the at least one dryer module operates in an air drying mode, and a second position, where the at least one dryer module operates in a regenerative mode, wherein the single controllable valve, when in the first position, opens the inlet air passage and blocks the wash air passage to form a supply air flow path from the inlet air passage into the desiccant canister via the plurality of canister holes, through the desiccant canister in a first direction, and out of the desiccant canister to the outlet air passage via the drying orifice, and when in the second position, blocks the inlet air passage and opens the wash air passage to form a wash air flow path from the outlet air passage into the desiccant canister via the drying orifice, through the desiccant canister in a direction opposite the first direction, and out of the desiccant canister to the wash air passage via the plurality of canister holes.

4. A regenerative air dryer system comprising:

at least one dryer module including:
- a housing having an inlet air passage, a wash air passage, and an outlet passage;
- a desiccant canister including a plurality of canister holes and a drying orifice, the desiccant canister mounted to the housing and in communication with the outlet air passage via only the drying orifice and in communication with the inlet and wash air passages via only the plurality of canister holes; and a single controllable spool valve moveable between a first position, where the at least one dryer module operates in an air drying mode, and a second position, where the at least one dryer module operates in a regenerative mode, wherein the single controllable valve, when in the first position, forms a supply air flow path from the inlet air passage into the desiccant canister via the plurality of canister holes, through the desiccant canister in a first direction, and out of the desiccant canister to the outlet air passage via the drying orifice, and when in the second position, forms a wash air flow path from the outlet air passage into the desiccant canister via the drying orifice, through the desiccant canister in a direction opposite the first direction, and out of the desiccant canister to the wash air passage via the plurality of canister holes; and a single check valve disposed within the drying orifice, the check valve having a regeneration orifice extending there through, wherein the check valve opens to allow supply air to pass from the desiccant canister to outlet air passage when the at least one dryer module is in the air drying mode, and wherein the check valve closes and allows a wash air flow through the regeneration orifice from the outlet air passage into the desiccant canister when the at least one dryer module is in the regenerative mode.

5. A modular regenerative air dryer system including:

a plurality of dryer modules, each dryer module including:
- a housing having a first side face, an opposing second side face, a top face and a bottom face, including a first inlet port and a first outlet port disposed on the first side face and a second inlet port and a second outlet port disposed on the second side, with an inlet air passage extending through the housing between the first and second inlet ports, an outlet passage extending through the housing between the first and second outlet ports, and a wash air passage extending within the housing to an exhaust port on the bottom face; and
- a desiccant canister mounted to the top face of the housing and in communication with the inlet, outlet, and wash air passages;

wherein for each of the plurality of dryer modules, the first side face of the housing is coupled to one of the first and second side face of another one of the dryer modules such that inlet air passages and outlet air passages of all of the dryer modules of the plurality of dryer modules together form a contiguous inlet air passage and a contiguous outlet air passage to which the desiccant canister of each of the dryer modules is in communication, and wherein the wash air passage and exhaust port of each dryer module is independent of the other dyer modules.

6. The modular regenerative air dryer system of claim 5, wherein each dryer module includes a single controllable valve selectively moveable between a first position, where the dryer module is in an air drying mode, and a second position, where the dryer module is in a regenerative mode, wherein the single controllable valve, when in the first position forms a supply air flow path from the contiguous inlet air passage into the desiccant canister, through the desiccant canister in a first direction, and out of the desiccant canister to the contiguous outlet air passage, and when in the second position forms a wash air flow path from the contiguous outlet air passage into the desiccant canister, through the desiccant canister in a second direction opposite the first direction, and out of the desiccant canister to the wash air passage and exhaust port.

7. A modular regenerative air dryer system comprising:

a plurality of dryer modules, each dryer module including:
- a housing having an inlet air passage extending therethrough, an outlet air passage extending therethrough, and a wash air passage extending within the housing to an exhaust port; and
- a dessicant canister selectively coupled to the housing and in communication with the inlet, outlet, and wash air passages;

wherein the housings of the dryer modules of the plurality of dryer modules are coupled together in series such that the inlet air passages and outlet air passages of all the dryer modules of the plurality of dryer modules together form a contiguous inlet air passage and a contiguous outlet air passage, and wherein the wash air passage and exhaust port of each dryer module of the plurality of dryer modules is independent of the wash air passage and exhaust port of the other dryer modules of the plurality of dryer modules.

8. The modular regenerative air dryer system of claim 7, wherein for each dryer module of the plurality of dryer modules the inlet air passage extends between a first inlet port and a second inlet port, and the outlet air passage extends between a first outlet port and a second outlet port, such that when housings of a pair of dryer modules are coupled in series, a first inlet port and a first outlet port of a one dryer module of the pair of dryer modules respectively couple to a second inlet port and a second outlet port of a the other dryer module of the pair of dryer modules.

9. The modular regenerative air dryer system of clam 8, wherein for each dryer module of the plurality of dryer modules, the first inlet port and the first outlet port are disposed on a first surface of the housing and the second inlet port and the second outlet port are disposed on an opposing second surface of the housing.

10. The modular regenerative air dryer system of claim 7, wherein each dryer module includes a single controllable valve selectively moveable between a first position, where the dryer module is in an air drying mode, and a second position, where the dryer module is in a regenerative mode.

11. The modular regenerative air dryer system of claim 10, wherein the single controllable valve, when in the first position forms a supply air flow path from the contiguous inlet air passage into the desiccant canister, through the desiccant canister in a first direction, and out of the desiccant canister to the contiguous outlet air passage, and when in the second position forms a wash air flow path from the contiguous outlet air passage into the desiccant canister, through the desiccant canister in a second direction opposite the first direction, and out of the desiccant canister to the wash air passage and exhaust port.

12. The modular regenerative air dryer system of claim 10, further including a control system configured to control movement of the single controllable valve of each dryer module of the plurality of dryer modules such that during operation of the modular regenerative air dryer system the single controllable valve of only one of the dryer modules of the plurality of dryer modules is in the second position at any time.

13. The modular regenerative air dryer system of claim 7, wherein the contiguous inlet air passage receives wet compressed via a first end of the contiguous inlet air passage and a second end of the contiguous inlet air passage is plugged, and wherein the contiguous outlet air passage is coupled to a compressed air storage container at a first end and a second end of the contiguous outlet air passage is plugged.

* * * * *